(12) United States Patent
Minoo et al.

(10) Patent No.: US 10,750,194 B2
(45) Date of Patent: Aug. 18, 2020

(54) SCALABLE VIDEO CODING USING REFERENCE AND SCALED REFERENCE LAYER OFFSETS

(71) Applicant: ARRIS Enterprises LLC, Suwanee, GA (US)

(72) Inventors: Koohyar Minoo, San Diego, CA (US); David M. Baylon, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/516,228

(22) Filed: Jul. 18, 2019

(65) Prior Publication Data

US 2020/0014943 A1   Jan. 9, 2020

Related U.S. Application Data

(63) Continuation of application No. 16/188,608, filed on Nov. 13, 2018, now Pat. No. 10,412,399, which is a
(Continued)

(51) Int. Cl.
*H04N 11/02*   (2006.01)
*H04N 19/33*   (2014.01)
(Continued)

(52) U.S. Cl.
CPC ........... *H04N 19/33* (2014.11); *H04N 19/167* (2014.11); *H04N 19/182* (2014.11);
(Continued)

(58) Field of Classification Search
CPC ...................................................... H04N 19/33
(Continued)

(56) References Cited

U.S. PATENT DOCUMENTS 9,491,459 B2   11/2016   Seregin
2004/0008790 A1   1/2004   Rodriguez
(Continued)

FOREIGN PATENT DOCUMENTS

WO   2013174254 A1   11/2013
WO   2013184954 A2   12/2013
(Continued)

OTHER PUBLICATIONS

Boyce, "Conditional SPS Extension Syntax for RExt, SHVC, and MV-HEVC", JVC-VC Meeting; Oct. 23, 2013-Nov. 1, 2013; Geneva, Joint Collaborative Team on Video Coding of ISO/IEC JTC1/SC29/WG11 and ITU-T SG.16.
(Continued)

*Primary Examiner* — Leron Beck
(74) *Attorney, Agent, or Firm* — Chernoff, Vilhauer, McClung & Stenzel, LLP

(57) ABSTRACT

A process for determining the selection of filters and input samples is provided for scalable video coding. The process provides for re-sampling using video data obtained from an encoder or decoder process of a base layer (BL) in a multi-layer system to improve quality in Scalable High Efficiency Video Coding (SHVC). In order to accommodate other applications such as interlace/progressive scalability and to increase the resolution of the alignment between layers, it is proposed that the phase offset adjustment parameters be signaled.

22 Claims, 6 Drawing Sheets

Related U.S. Application Data continuation of application No. 15/711,856, filed on Sep. 21, 2017, now Pat. No. 10,165,289, which is a continuation of application No. 14/661,867, filed on Mar. 18, 2015, now Pat. No. 9,813,724.

(60) Provisional application No. 61/955,123, filed on Mar. 18, 2014.

(51) Int. Cl.
*H04N 19/70* (2014.01)
*H04N 19/80* (2014.01)
*H04N 19/59* (2014.01)
*H04N 19/167* (2014.01)
*H04N 19/182* (2014.01)
*H04N 19/187* (2014.01)

(52) U.S. Cl.
CPC .......... *H04N 19/187* (2014.11); *H04N 19/59* (2014.11); *H04N 19/70* (2014.11); *H04N 19/80* (2014.11)

(58) Field of Classification Search
USPC ........................................ 375/240.01–240.29
See application file for complete search history.

(56) References Cited

U.S. PATENT DOCUMENTS

| | | |
|---|---|---|
| 2006/0268991 A1 | 11/2006 | Segall et al. |
| 2007/0189390 A1 | 8/2007 | Pappas et al. |
| 2009/0060040 A1 | 3/2009 | Jeon et al. |
| 2009/0274214 A1* | 11/2009 | Yoon .................... H04N 19/159 375/240.16 |
| 2010/0226437 A1 | 9/2010 | Robertson et al. |
| 2013/0287093 A1 | 10/2013 | Hannuksela |
| 2013/0329782 A1* | 12/2013 | Seregin ................ H04N 19/117 375/240.02 |
| 2013/0342644 A1 | 12/2013 | Rusanovskyy |
| 2014/0064386 A1* | 3/2014 | Chen .................... H04N 19/117 375/240.29 |
| 2014/0098883 A1 | 4/2014 | Hannuksela |
| 2014/0168362 A1 | 6/2014 | Hannuksela |
| 2014/0177718 A1* | 6/2014 | Rusert .................. H04N 19/105 375/240.16 |
| 2014/0192886 A1 | 7/2014 | Fran Ois |
| 2014/0218473 A1 | 8/2014 | Hannuksela |
| 2014/0254679 A1 | 9/2014 | Ramasubramonian et al. |
| 2014/0269897 A1 | 9/2014 | Baylon et al. |
| 2014/0301463 A1 | 10/2014 | Rusanovskyy |
| 2014/0301488 A1 | 10/2014 | Baylon et al. |
| 2014/0321560 A1* | 10/2014 | Ugur ...................... H04N 19/80 375/240.29 |
| 2014/0328398 A1* | 11/2014 | Chen ...................... H04N 19/33 375/240.12 |
| 2015/0110200 A1 | 4/2015 | Nakagami |
| 2015/0189298 A1 | 7/2015 | Ye |
| 2015/0195554 A1* | 7/2015 | Misra ...................... H04N 19/30 375/240.25 |
| 2015/0195574 A1 | 7/2015 | Yu et al. |
| 2015/0237376 A1 | 8/2015 | Alshina |
| 2015/0245063 A1 | 8/2015 | Rusanovskyy |
| 2015/0304665 A1 | 10/2015 | Hannuksela |
| 2015/0319447 A1 | 11/2015 | Minoo et al. |
| 2015/0319477 A1 | 11/2015 | Haberman |
| 2015/0341661 A1 | 11/2015 | Alshina et al. |
| 2015/0350662 A1 | 12/2015 | Minoo et al. |
| 2016/0088303 A1 | 3/2016 | Lee |
| 2016/0353115 A1* | 12/2016 | Samuelsson ......... H04N 19/597 |
| 2018/0242008 A1 | 8/2018 | Minoo et al. |

FOREIGN PATENT DOCUMENTS

| | | |
|---|---|---|
| WO | 2014025741 A2 | 2/2014 |
| WO | 2014039547 A1 | 3/2014 |
| WO | 2014/189300 A1 | 11/2014 |

OTHER PUBLICATIONS

Bross, B., et al., "High Efficiency Video Coding (HEVC) text specification draft 10 (for FDIS & Last Call)," Document of Joint Collaborative Team on Video Coding, JCTVC-L1003_v34, 12th Meeting: Geneva, CH, Jan. 14-23, 2013.

Flynn, D., et al., "High Efficiency Video Coding (HEVC) Range Extensions text specification: Draft 4," JCTVC-N1005_v3, Aug. 2013.

Gerhard T., et al, "MV-HEVC Draft Text 6," Joint Collaborative Team on 3D Video Coding Extension Development ITU-T SG 16 WP 3 and ISO/IEC JTC 1/SC 29/WG 11, 6th Meeting: Geneva, JCT3V-F1004-v6, Nov. 2013.

Yu, Y., et al., "Some Syntax Modifications for HEVC Range Extension", Joint Collaborative Team on Video Coding Extensions of ITU-T SG 16 WP3 & ISO/IEC JTC VSC 29/WG11, JCTVC-P0166, Jan. 2014.

Flynn, D., et al., "High Efficiency Video Coding (HEVC) Range Extensions text specification: Draft 5", Joint Collaborative Team on Video Coding Extensions of ITU-T SG 16 WP3 & ISO/IEC JTC VSC 29/WG11, JCTVC-O1005_v1, Apr. 2013.

E. Alshina, "AHG13: Re-sampling process with generic phase", 18th JCT-VC Meeting (Joint Collaborative Team on Video Coding of ISO/IEC JTC1/SC29/WG11 and ITU-T SG16), Jul. 2, 2014.

J. Boyce, "BoG report on SHVC upsampling process and phase offset", 17th JCT-VC Meeting (Joint Collaborative Team on Video Coding of ISO/IEC JTC1/SC29/WG11 and ITU-T SG16), Apr. 3, 2014.

"High Efficiency Video Coding", Series H: Audiovisual and Multimedia Systems; Infrastructure of audiovisual services—Coding of moving video, ITU-T Telecommunication Standardization Sector of ITU, H.265, Apr. 2013, 317 pgs.

K. Minoo, et al., "AHG13: SHVC Upsampling with phase offset adjustment", 104th MPEG Meeting (Motion Picture Expert Group or ISO/IEC JTC1/SC29/WG11), Apr. 20, 2013.

J. Chen, et al., "MV-HEVC/SHVC HLS: On signaling of scaled reference offset", 14th JCT-VC Meeting (Joint Collaborative Team on Video Coding of ISO/IEC JTC1/SC29/WG11 and ITU-T SG.16) Jul. 16, 2013.

G.J. Sullivan, et al., "Standardized Extensions of High Efficiency Video Coding (HEVC)", IEEE Journal of Selected Topics in Signal Processing., vol. 7, No. 6, Dec. 1, 2013, pp. 1001-1016.

K. Andersson, et al., "Fix for the computation of scaling factors used in inter-layer prediction", 17th JCT-VC Meeting (Joint Collaborative Team on Video Coding of ISO/IEC JTC1/SC29/WG11 and ITU-T SG.16), Mar. 17, 2014.

K. Minoo, et al., "Increased resolution for scaled reference layer offset" 17th JCT-VC Meeting (Joint Collaborative Team on Video Coding of ISO/IEC JTC1/SC29/WG11 and ITU-T SG.16), Mar. 27, 2014.

Y Ye, et al., "SHVC HLS: On picture level resampling phase filter selection", 17th JCT-VC Meeting (Joint Collaborative Team on Video Coding of ISO/IEC JTC1/SC29/WG11 and ITU-T SG.16), Mar. 18, 2014.

K. Minoo, et al., "Re-sampling with phase offset adjustment and signaling using phase index re-mapping," ARRIS disclosure ARR00176-P (U.S. Appl. No. 61/923,450), filed Jan. 3, 2014.

K. Minoo, et al., "SCE1: Results of Test 2.2 on phase compensation by signaling filter coefficients at PPS with sample shift", JCTVC-N0078, 14th JCT-VC Meeting, Vienna, AT, Jul. 2013, 4 pgs.

K. Minoo, et al., "Non-SCE1: On handling re-sampling phase offsets with fixed filters", JCTVC-N0272, 14th JCT-VC Meeting, Vienna, AT, Jul. 2013, 5 pgs.

J. Chen, et al., "High efficiency video coding (HEVC) scalable extension Draft 5," JCTVC-P1008_v4, Jan. 2014, 125 pgs.

(56) References Cited

OTHER PUBLICATIONS

K. Minoo, et all., "On handling re-sampling phase offsets with fixed filters", JCTVC-P0177-R1, 16th JCT-VC Meeting, San Jose, US, Jan. 2014, 6 pgs.

J. Chen, et al., "Description of scalable video coding technology proposal by Qualcomm (configuration 2)" 11th JCT-VC Meeting; 102. MPEG Meeting; Oct. 2, 2012, 22 pgs.

B. Bross, et al., "High Efficiency Video Coding (HEVC) text specification draft 8", 10th JCT-VC Meeting; 101. MPEG Meeting; Jul. 23, 2012, 286 pgs.

S-W Park, et al., "Intra BL pred. & phase shift", 15th JVT Meeting; 72. MPEG Meeting; Apr. 16, 2005, 16 pgs.

J. Dong, et al., "Upsampling based on sampling grid information for aligned inter layer prediction", 13th JCT-VC Meeting; 104; MPEG Meeting; Apr. 8, 2013, 10 pgs.

K, Minoo, et al., "Report of side activity on reference position derivation", Joint Collaborative Team on Video Coding (JCT-VC) of ITU-T SG 16 WP 3 and ISO/IEC JTC 1/SC 29/WG 11, 17th Meeting, Mar. 27-Apr. 4, 2014, 10 pgs.

D. Kwon, et al., "Reference-layer cropping offsets signaling in SHVC", Joint Collaborative Team on Video Coding (JCT-VC) of ITU-T SG 16 WP 3 and ISO/IEC JTC 1/SC 29/WG 11, 13th Meeting, Apr. 18-26, 2013, 2 pgs.

\* cited by examiner

SCALABLE VIDEO CODING USING REFERENCE AND SCALED REFERENCE LAYER OFFSETS

CROSS REFERENCE TO RELATED APPLICATION

The present application is a continuation of U.S. patent application Ser. No. 16/188,608 filed on Nov. 13, 2018, which is a continuation of now U.S. Pat. No. 10,165,289 which issued on Dec. 25, 2018, which is a continuation of now U.S. Pat. No. 9,812,724 issued on Nov. 7, 2017, which claims priority under 35 U.S.C. § 119(e) from earlier filed U.S. Provisional Application Ser. No. 61/955,123 filed on Mar. 18, 2014, both of which are incorporated herein by reference in their entirety.

TECHNICAL FIELD

The present invention relates to a sampling filter process for scalable video coding. More specifically, the present invention relates to re-sampling using video data obtained from an encoder or decoder process, where the encoder or decoder process can be MPEG-4 Advanced Video Coding (AVC) or High Efficiency Video Coding (HEVC). Further, the present invention specifically relates to Scalable HEVC (SHVC) that includes a two layer video coding system.

BACKGROUND

Scalable video coding (SVC) refers to video coding in which a base layer (BL), sometimes referred to as a reference layer, and one or more scalable enhancement layers (EL) are used. For SVC, the base layer can carry video data with a base level of quality. The one or more enhancement layers can carry additional video data to support higher spatial, temporal, and/or signal-to-noise SNR levels. Enhancement layers may be defined relative to a previously coded layer.

The base layer and enhancement layers can have different resolutions. Upsampling filtering, sometimes referred to as resampling filtering, may be applied to the base layer in order to match a spatial aspect ratio or resolution of an enhancement layer. This process may be called spatial scalability. An upsampling filter set can be applied to the base layer, and one filter can be chosen from the set based on a phase (sometimes referred to as a fractional pixel shift). The phase may be calculated based on the ratio between base layer and enhancement layer picture resolutions.

SUMMARY

Embodiments of the present invention provide methods, devices and systems for the upsampling process from BL resolution to EL resolution to implement the upsampling of FIG. 2. The upsampling process of embodiments of the present invention includes three separate modules, a first module to select input samples from the BL video signal, a second module to select a filter for filtering the samples, and a third module using phase filtering to filter the input samples to recreate video that approximates the EL resolution video. The filters of the third module can be selected from a set of fixed filters each with different phase. In these modules, the selection of the input samples and filters for generating the output samples are determined based upon a mapping between the EL sample positions and the corresponding BL sample positions. The embodiments included herein are related to the mapping or computation between the EL and the BL sample positions.

One embodiment includes a system for scalable video coding, comprising a first coding layer comprising modules for coding video with a base resolution; a second coding layer comprising modules for coding video with an enhanced resolution having a higher resolution than a base resolution; wherein pixel values in the second coding layer are predicted based on pixel values in the first coding layer; wherein the prediction of a value at a pixel location in the second coding layer is based on a corresponding value at a pixel location in the first coding layer; wherein the corresponding pixel location in the first coding layer is computed based on the pixel location in the second coding layer; wherein the computation uses a ScaledRefLayerOffset parameter that specifies an offset between the sample in the second layer that is collocated with the top-left sample of the first layer and the top-left sample of the second layer; wherein the signaling of the ScaledRefLayerOffset parameter occurs at the PPS level.

Another embodiment includes a system for scalable video coding, comprising a first coding layer comprising modules for coding video with a base resolution; a second coding layer comprising modules for coding video with an enhanced resolution having a higher resolution than a base resolution; wherein pixel values in the second coding layer are predicted based on pixel values in the first coding layer; wherein the prediction of a value at a pixel location in the second coding layer is based on a corresponding value at a pixel location in the first coding layer; wherein the corresponding pixel location in the first coding layer is computed based on the pixel location in the second coding layer; wherein the computation uses a RefLayerOffset parameter that specifies an offset between the sample in the second layer that is collocated with the top-left sample of the first layer and the top-left sample of the second layer.

Also disclosed is a system for scalable video coding, comprising a first coding layer comprising modules for coding video with a base resolution; a second coding layer comprising modules for coding video with an enhanced resolution having a higher resolution than a base resolution; wherein pixel values in the second coding layer are predicted based on pixel values in the first coding layer; wherein the prediction of a value at a pixel location in the second coding layer is based on a corresponding value at a pixel location in the first coding layer; wherein the corresponding pixel location in the first coding layer is computed based on the pixel location in the second coding layer; wherein the computation uses a ScaledRefLayerPhase parameter that specifies a phase shift used in the resampling process.

Another embodiment discloses a method for scalable video coding, comprising: determining if a pps_extension_type_flag[1] is set; parsing the pps_multilayer_extension syntax if the pps_extension_type_flag[1] is set; determining if a scaled_reference_offset_present_flag flag is set; parsing the scaled reference layer offset parameters if the scaled_reference_offset_present_flag flag is set; determining if a reference_phase_present_flag flag is set; parsing the reference layer offset parameters if the reference_phase_present_flag flag is set; determining reference layer position locations based on the offset parameters for use in selecting and filtering reference layer values.

BRIEF DESCRIPTION OF THE DRAWINGS

Further details of the present invention are explained with the help of the attached drawings in which.

DETAILED DESCRIPTION

Figure 1:
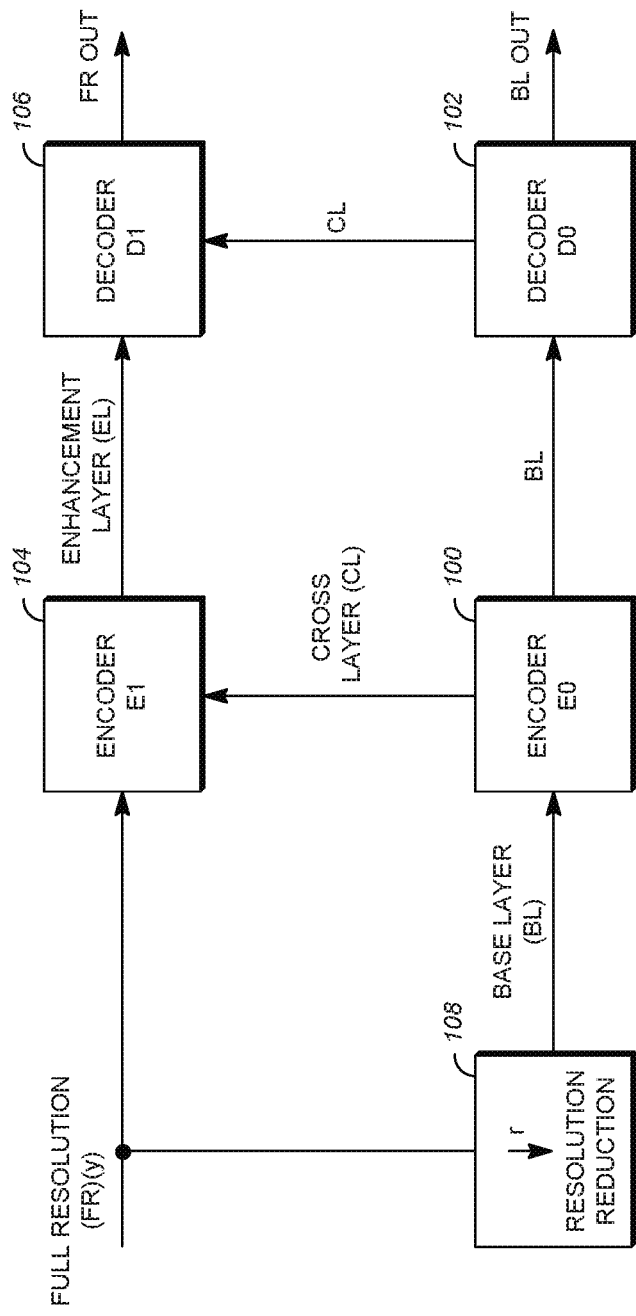
FIG. 1 is a block diagram of components in a scalable video coding system with two layers.

An example of a scalable video coding system using two layers is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the remaining layers, such as the Full Resolution (FR) layer that receives an input FR (y). The FR layer includes an encoder E1, labeled 104, and a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of coding that can use two layers shown in FIG. 1 includes video coding using AVC and the Scalable Video Coding (SVC) extension of AVC, respectively. Another example that can use two layer coding is HEVC.

FIG. 1 further shows block 108 with a down-arrow r illustrating a resolution reduction from the FR to the BL to illustrate that the BL can be created by a downsampling of the FR layer data. Although a downsampling is shown by the arrow r of block 108 FIG. 1, the BL can be independently created without the downsampling process. Overall, the down arrow of block 108 illustrates that in spatial scalability, the base layer BL is typically at a lower spatial resolution than the full resolution FR layer. For example, when r=2 and the FR resolution is 3840×2160, the corresponding BL resolution is 1920×1080.

The cross-layer CL information provided from the BL to the FR layer shown in FIG. 1 illustrates that the CL information can be used in the coding of the FR video in the EL. In one example, the CL information includes pixel information derived from the encoding and decoding process of the BL. Examples of BL encoding and decoding are AVC and HEVC. Because the BL pictures are at a different spatial resolution than the FR pictures, a BL picture needs to be upsampled (or re-sampled) back to the FR picture resolution in order to generate a suitable prediction for the FR picture.

Figure 2:
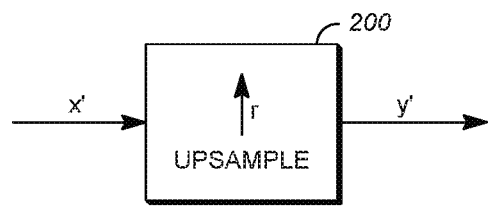
FIG. 2 illustrates an upsampling process that can be used to convert the base layer data to the full resolution layer data for FIG. 1.

FIG. 2 illustrates an upsampling process in block 200 of data from the BL layer to the EL. The components of the upsampling block 200 can be included in either or both of the encoder E1 104 and the decoder D1 106 of the EL of the video coding system of FIG. 1. The BL data at resolution x that is input into upsampling block 200 in FIG. 2 is derived from one or more of the encoding and decoding processes of the BL. A BL picture is upsampled using the up-arrow r process of block 200 to generate the EL resolution output y' that can be used as a basis for prediction of the original FR input y.

The upsampling block 200 works by interpolating from the BL data to recreate what is modified from the FR data. For instance, if every other pixel is dropped from the FR in block 108 to create the lower resolution BL data, the dropped pixels can be recreated using the upsampling block 200 by interpolation or other techniques to generate the EL resolution output y' from upsampling block 200. The data y' is then used to make encoding and decoding of the EL data more efficient.

I. Overview of Upsampling Circuitry

Figure 3:
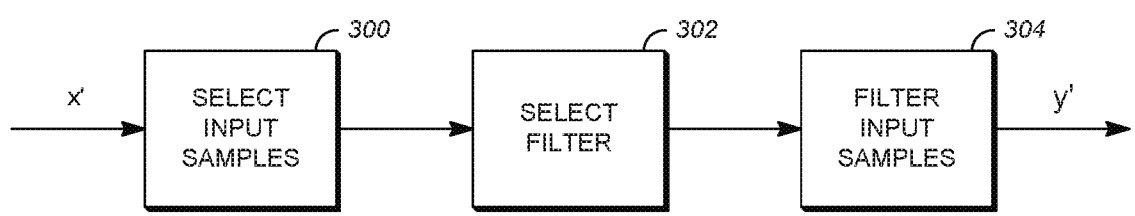
FIG. 3 shows a block diagram of components for implementing the upsampling process of FIG. 2.

FIG. 3 shows a general block diagram for implementing an upsampling process of FIG. 2 for embodiments of the present invention. The upsampling or re-sampling process can be determined to minimize an error E (e.g. mean-squared error) between the upsampled data y' and the full resolution data y. The system of FIG. 3 includes a select input samples module 300 that samples an input video signal. The system further includes a select filter module 302 to select a filter from the subsequent filter input samples module 304 to upsample the selected input samples from module 300.

In module 300, a set of input samples in a video signal x is first selected. In general, the samples can be a two-dimensional subset of samples in x, and a two-dimensional filter can be applied to the samples. The module 302 receives the data samples in x from module 300 and identifies the position of each sample from the data it receives, enabling module 302 to select an appropriate filter to direct the samples toward a subsequent filter module 304. The filter in module 304 is selected to filter the input samples, where the selected filter is chosen or configured to have a phase corresponding to the particular output sample location desired.

The filter input samples module 304 can include separate row and column filters. The selection of filters is represented herein as filters h[n; p], where the filters can be separable along each row or column, and p denotes a phase index selection for the filter. The output of the filtering process using the selected filter h[n;p] on the selected input samples produces output value y'.

Figure 4:
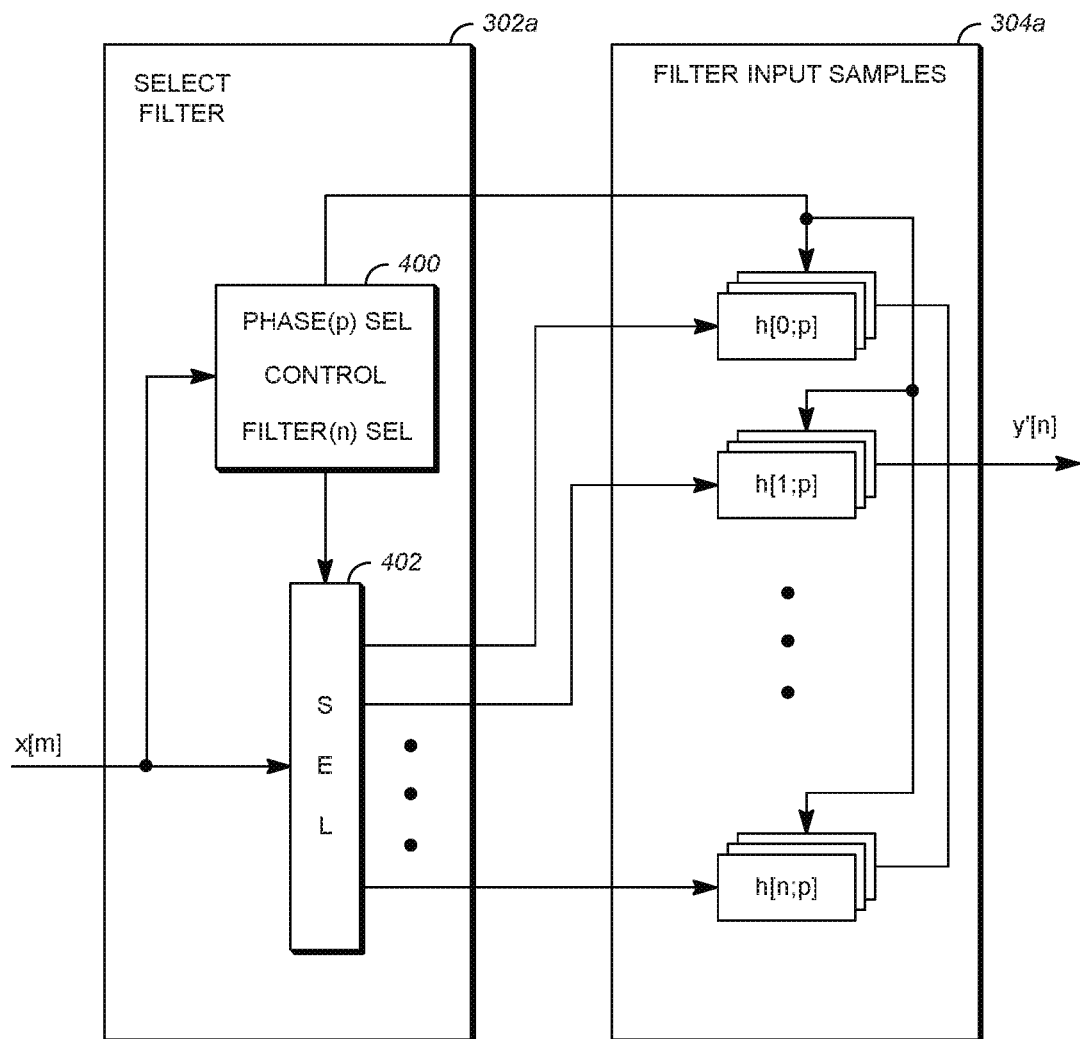
FIG. 4 shows components of the select filter module and the filters, where the filters are selected from fixed or adaptive filters to apply a desired phase shift.

FIG. 4 shows details of components for the select sample module 302 of FIG. 3 (labeled 302a in FIG. 4) and the filters module 304 of FIG. 3 (labeled 304a in FIG. 4) for a system with fixed filters. For separable filtering the input samples can be along a row or column of data. To supply a set of input samples from select input samples module 300, the select filter module 302a includes a select control 400 that identifies the input samples x[m] and provides a signal to a selector 402 that directs them through the selector 402 to a desired filter. The filter module 304a then includes the different filters h[n;p] that can be applied to the input samples, where the filter phase can be chosen among P phases from each row or column element depending on the output sample m desired. As shown, the selector 402 of module 302a directs the input samples to a desired column or row filter in 304a based on the "Filter (n) SEL" signal from select control 400. A separate select control 400 signal "Phase (p) SEL" selects the appropriate filter phase p for each of the row or column elements. The filter module 304a output produces the output y'[n].

In FIG. 4, the outputs from individual filter components h[n;p] are shown added "+" to produce the output y'[n]. This illustrates that each box, e.g. h[0;p], represents one coefficient or number in a filter with phase p. Therefore, the filter with phase p is represented by all n+1 numbers in h[0,p], h[n;p]. This is the filter that is applied to the selected input samples to produce an output value y'[n], for example, y'[0]=h[0,p]*x[0]+h[1,p]*x[1]+ . . . +h[n,p]*x[n], requiring the addition function "+" as illustrated. As an alternative to adding in FIG. 4, the "+" could be replaced with a solid connection and the output y' [n] would be selected from one output of a bank of P filters representing the p phases, with the boxes h[n:p] in module 304*a* relabeled, for example, as h[n;0], h[n,1], h[n,p−1] and now each box would have all the filter coefficients needed to form y' [n] without the addition element required.

II. Current Syntax for Signaling Scaled Reference Layer Offsets

In order to accommodate for offset and phase shift differences between the BL and EL samples, phase offset adjustment parameters can be signaled. Let a sample location relative to the top-left sample in the current EL picture be (xP, yP), and a sample location in the BL reference layer in units of 1/16 sample relative to the top-left sample of the BL be (xRef16, yRef16). In "High efficiency video coding (HEVC) scalable extension Draft 5," JCTVC-P1008_v4, January 2014 ("HEVC Draft 5"), the relationship between (xRef16, yRef16) and (xP, yP) is given as follows:

$$xRef16=(((xP-offsetX)*ScaleFactorX+addX+(1<<11))>>12)-(phaseX<<2)$$

$$yRef16=(((yP-offsetY)*ScaleFactorY+addY+(1<<11))>>12)-(phaseY<<2)$$

The sample position (xRef16, yRef16) is used to select the input samples and the filters used in computing the output sample values as specified in HEVC Draft 5.

The variables offsetX, addX, offsetY, and addY specify scaled reference layer offset and phase parameters in the horizontal and vertical directions, variables phaseX and phaseY specify reference layer phase offset parameters in the horizontal and vertical directions, and variables ScaleFactorX and ScaleFactorY are computed based on the ratio of the reference layer to the scaled reference layer width and height. These variables are computed based upon phase offset parameters specified in [1]. In particular, the offset parameters offsetX and offsetY are computed as:

$$offsetX=ScaledRefLayerLeftOffset/((cIdx==0)?1:SubWidthC)$$

$$offsetY=ScaledRefLayerTopOffset/((cIdx==0)?1:SubHeightC)$$

where variable cIdx specifies the color component index and the values SubWidthC and SubHeightC are specified depending on the chroma format sampling structure and $$ScaledRefLayerLeftOffset=scaled\_ref\_layer\_left\_offset[rLId]<<1$$

$$ScaledRefLayerTopOffset=scaled\_ref\_layer\_top\_offset[rLId]<<1$$

$$ScaledRefLayerRightOffset=scaled\_ref\_layer\_right\_offset[rLId]<<1$$

$$ScaledRefLayerBottomOffset=scaled\_ref\_layer\_bottom\_offset[rLId]<<1$$

where rLId specifies the scaled reference layer picture Id. The variables ScaledRefLayerLeftOffset, ScaledRefLayerTopOffset, ScaledRefLayerRightOffset, and ScaledRefLayerBottomOffset specify offsets in two pixel unit resolution based on the values of the syntax elements scaled_ref_layer_left_offset[rLId], scaled_ref_layer_top_offset[rLId], scaled_ref_layer_right_offset[rLId], and scaled_ref_layer_bottom_offset[rLId].

Table 1 illustrates the signaling of these syntax elements in HEVC Draft 5 at the SPS multilayer extension layer.

TABLE 1

Current Syntax for signaling scaled layer offsets.

| | Descriptor |
|---|---|
| sps_multilayer_extension( ) { | |
|     inter_view_mv_vert_constraint_flag | u(1) |
|     num_scaled_ref_layer_offsets | ue(v) |
|     for( i = 0; i < num_scaled_ref_layer_offsets; i++) { | |
|         scaled_ref_layer_id[ i ] | u(6) |
|         scaled_ref_layer_left_offset[ scaled_ref_layer_id[ i ] ] | se(v) |
|         scaled_ref_layer_top_offset[ scaled_ref_layer_id[ i ] ] | se(v) |
|         scaled_ref_layer_right_offset[ scaled_ref_layer_id[ i ] ] | se(v) |
|         scaled_ref_layer_bottom_offset[ scaled_ref_layer_id[ i ] ] | se(v) |
|         vert_phase_position_enable_flag[ scaled_ref_layer_id[ i ] ] | u(1) |
|     } | |
| } | |

In Table 1, the signaling occurs at the SPS level. Table 1 shows current syntax for signaling scaled layer offsets (shown in bold type). In Table 1, the four syntax elements listed below are signaled.

scaled_ref_layer_left_offset[scaled_ref_layer_id[*i*]]

scaled_ref_layer_top_offset[scaled_ref_layer_id[*i*]]

scaled_ref_layer_right_offset[scaled_ref_layer_id[*i*]]

scaled_ref_layer_bottom_offset[scaled_ref_layer_id[*i*]]

In HEVC Draft 5, the syntax elements are defined as follows:

scaled_ref_layer_id[i] specifies the nuh_layer_id value of the associated inter-layer picture for which scaled_ref_layer_left_offset[i], scaled_ref_layer_top_offset[i], scaled_ref_layer_right_offset[i] and scaled_ref_layer_bottom_offset[i] are specified. The value of scaled_ref_layer_id[i] shall be less than the nuh_layer_id of any layer for which this SPS is the active SPS.

scaled_ref_layer_left_offset[scaled_ref_layer_id[i]] specifies the horizontal offset between the top-left luma sample of the associated inter-layer picture with nuh_layer_id equal to scaled_ref_layer_id[i] and the top-left luma sample of the current picture in units of two luma samples.

When not present, the value of scaled_ref_layer_left_offset [scaled_ref_layer_id[i]] is inferred to be equal to 0.

scaled_ref_layer_top_offset[scaled_ref_layer_id[i]] specifies the vertical offset between the top-left luma sample of the associated inter-layer picture with nuh_layer_id equal to scaled_ref_layer_id[i] and the top-left luma sample of the current picture in units of two luma samples. When not present, the value of scaled_ref_layer_top_offset[scaled_ref_layer_id[i]] is inferred to be equal to 0.

scaled_ref_layer_right_offset[scaled_ref_layer_id[i]] specifies the horizontal offset between the bottom-right luma sample of the associated inter-layer picture with nuh_layer_id equal to scaled_ref_layer_id[i] and the bottom-right luma sample of the current picture in units of two luma samples. When not present, the value of scaled_ref_layer_right_offset[scaled_ref_layer_id[i]] is inferred to be equal to 0.

scaled_ref_layer_bottom_offset[scaled_ref_layer_id[i]] specifies the vertical offset between the bottom-right luma sample of the associated inter-layer picture with nuh_layer_id equal to scaled_ref_layer_id[i] and the bottom-right luma sample of the current picture in units of two luma samples. When not present, the value of scaled_ref_layer_bottom_offset[scaled_ref_layer_id[i]] is inferred to be equal to 0.

While the offset parameters are signaled at the SPS level, it is desirable to signal below the sequence level in order to accommodate other applications and operations such as interlace/progressive scalability and pan and scan. In addition, it is desirable to increase the resolution of the offset for proper BL and EL alignment.

Proposed Reference Layer Offsets and Increased Resolution for Scaled Reference Layer Offsets In order to accommodate other applications such as interlace/progressive scalability and to increase the resolution for BL and EL alignment, it is proposed that the phase offset adjustment parameters in Tables 2 and 3 be signaled. It is also possible to signal at other levels such as the slice level. Other variations are also possible, such as a flag signaling whether or not offset parameters are signaled at all, or per dimension or color component. Note that fractional pel accuracy of the phase offset parameters can be given in $\frac{1}{16}$, $\frac{1}{4}$, or $\frac{1}{2}$, etc.

In the proposed method, the scaled reference layer offset parameters are signaled at the PPS level. In Table 2, the pps_multilayer_extension syntax is parsed if a pps_extension_type_flag[1] (e.g. pps_multilayer_extension_flag) is set. Table 3 shows the scaled_ref_layer_id, scaled_ref_layer_left_offset, scaled_ref_layer_top_offset, scaled_ref_layer_right_offset and scaled_ref_layer_bottom_offset syntax elements signaled in the pps_multilayer_extension.

The resolution of the scaled reference layer offset can be increased from 2-integer pel. The original coarser resolution allows for selection of a region in the scaled reference layer, while the additional proposed finer resolution allows for finer local phase offset adjustment between layers. Table 3 shows an example of the signaling of the proposed additional phase offset parameters:

scaled_ref_layer_left_phase[scaled_ref_layer_id[i]] specifies the horizontal luma offset between nuh_layer_id equal to scaled_ref_layer_id[i] and the current picture in units of $\frac{1}{2}$ luma samples. This is a signed value between −2 to +2. When not present, the value of scaled_ref_layer_left_phase[scaled_ref_layer_id[i]] is inferred to be equal to 0.

scaled_ref_layer_top_phase[scaled_ref_layer_id[i]] specifies the vertical luma offset between nuh_layer_id equal to scaled_ref_layer_id[i] and the current picture in units of $\frac{1}{2}$ luma samples. This is a signed value between −2 to +2. When not present, the value of scaled_ref_layer_top_phase[scaled_ref_layer_id[i]] is inferred to be equal to 0.

ref_layer_horizontal_delta[scaled_ref_layer_id[i]] specifies the horizontal luma offset between nuh_layer_id equal to scaled_ref_layer_id[i] and the current picture in units of $\frac{1}{8}$ luma samples. This is a signed value between −8 to 8. When not present, the value of ref_layer_horizontal_delta[scaled_ref_layer_id[i]] is inferred to be equal to 0.

ref_layer_vertical_delta[scaled_ref_layer_id[i]] specifies the vertical luma offset between nuh_layer_id equal to scaled_ref_layer_id[i] and the current picture in units of $\frac{1}{8}$ luma samples. This is a signed value between −8 to +8. When not present, the value of ref_layer_vertical_delta[scaled_ref_layer_id[i]] is inferred to be equal to 0.

ref_layer_horizontal_delta_chroma[scaled_ref_layer_id[i]] specifies the horizontal offset between the chroma samples and luma samples in nuh_layer_id equal to scaled_ref_layer_id[i] in units of $\frac{1}{4}$ luma samples. This is an unsigned value between 0 to 4. When not present, the value of ref_layer_horizontal_delta_chroma[scaled_ref_layer_id[i]] is inferred to be equal to 2.

ref_layer_vertical_delta_chroma[scaled_ref_layer_id[i]] specifies the vertical offset between the chroma samples and luma samples in nuh_layer_id equal to scaled_ref_layer_id[i] in units of $\frac{1}{4}$ luma samples. This is an unsigned value between 0 to 4. When not present, the value of ref_layer_vertical_delta_chroma [scaled_ref_layer_id[i]] is inferred to be equal to 2.

scaled_ref_layer_left_phase_chroma specifies the horizontal chroma offset relative to luma in units of $\frac{1}{4}$ luma samples. This is an unsigned value between 0 to 4. When not present, the value of scaled_ref_layer_left_phase_chroma is inferred to be equal to 2.

scaled_ref_layer_top_phase_chroma specifies the vertical chroma offset relative to luma in units of $\frac{1}{4}$ luma samples. This is an unsigned value between 0 to 4. When not present, the value of scaled_ref_layer_top_phase_chroma is inferred to be equal to 2.

The additional syntax elements are used to provide finer alignment between the layers. One example of the use of the syntax is as follows:

ScaledRefLayerLeftPhase=scaled_ref_layer_left_phase[rLId]

ScaledRefLayerTopPhase=scaled_ref_layer_top_phase[rLId]

RefLayerHorizontalDelta=ref_layer_horizontal_delta[rLId]

RefLayerVerticalDelta=ref_layer_vertical_delta[rLId]

RefLayerHorizontalDeltaChroma=ref_layer_horizontal_delta_chroma[rLId]

RefLayerVerticalDeltaChroma=ref_layer_vertical_delta_chroma[rLId]

phaseX=(cIdx==0)?(ScaledRefLayerLeftPhase<<2):(ScaledRefLayerLeftPhase<<1+scaled_ref_layer_left_phase_chroma)

phaseY=(cIdx==0)?(ScaledRefLayerTopPhase<<2):(ScaledRefLayerTopPhase<<1+scaled_ref_layer_top_phase_chroma)

deltaX=(cIdx==0)?(RefLayerHorizontalDelta<<1):(RefLayerHorizontalDelta+RefLayerHorizontalDeltaChroma<<1)

deltaY=(cIdx==0)?(RefLayerVerticalDelta<<1):(RefLayerVerticalDelta+RefLayerVerticalDeltaChroma<<1)

addX=(ScaleFactorX*phaseX+4)>>3

$addY = (ScaleFactorY * phaseY + 4) >> 3$ $xRef16 = (((xP - \text{offsetX}) * ScaleFactorX + addX + (1 << 11)) >> 12) - deltaX$ $yRef16 = (((yP - \text{offsetY}) * ScaleFactorY + addY + (1 << 11)) >> 12) - deltaY$ The scaled reference layer phase offset parameters scaled_ref_layer_left_phase, scaled_ref_layer_left_phase_chroma, scaled_ref_layer_top_phase, and scaled_ref_layer_top_phase_chroma provide additional independent finer level or resolution over the previous scaled reference layer phase offset parameters scaled_ref_layer_left_offset, scaled_ref_layer_top_offset, scaled_ref_layer_right_offset and scaled_ref_layer_bottom_offset. In addition, the reference layer phase offset parameters ref_layer_horizontal_delta, ref_layer_vertical_delta, ref_layer_horizontal_delta_chroma and ref_layer_vertical_delta_chroma provide finer reference layer phase offset resolution.

TABLE 2

Proposed syntax for activating PPS multilayer extension.

| | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   pps_extension_flag | u(1) |
|   if( pps_extension_flag ) { | |
|     for ( i = 0; i < 8; i++ ) | |
|       pps_extension_type_flag[ i ] | u(1) |
|     if( pps_extension_type_flag[ 0 ] ) | |
|       poc_reset_info_present_flag | u(1) |
|     if( pps_extension_type_flag[ 1 ] ) | |
|       pps_multilayer_extension( ) | |
|     if( pps_extension_type_flag[ 7 ] ) | |
|       while( more_rbsp_data( ) ) | |
|         pps_extension_data_flag | u(1) |
|   } | |
|   rbsp_trailing_bits( ) | |
| } | |

The proposed syntax allows for interlace to progressive scalability and finer alignment between layers. Example syntax was given to illustrate how additional phase offset parameters in both scaled reference layer and the reference layer can be used for alignment between layers.

In one proposed approach, the resolution of the scaled reference layer offset is increased from 2-integer pel. The original coarser resolution allows for selection of a region in the scale reference layer, while the additional proposed finer resolution allows for finer local phase offset between layers.

Figure 5A:
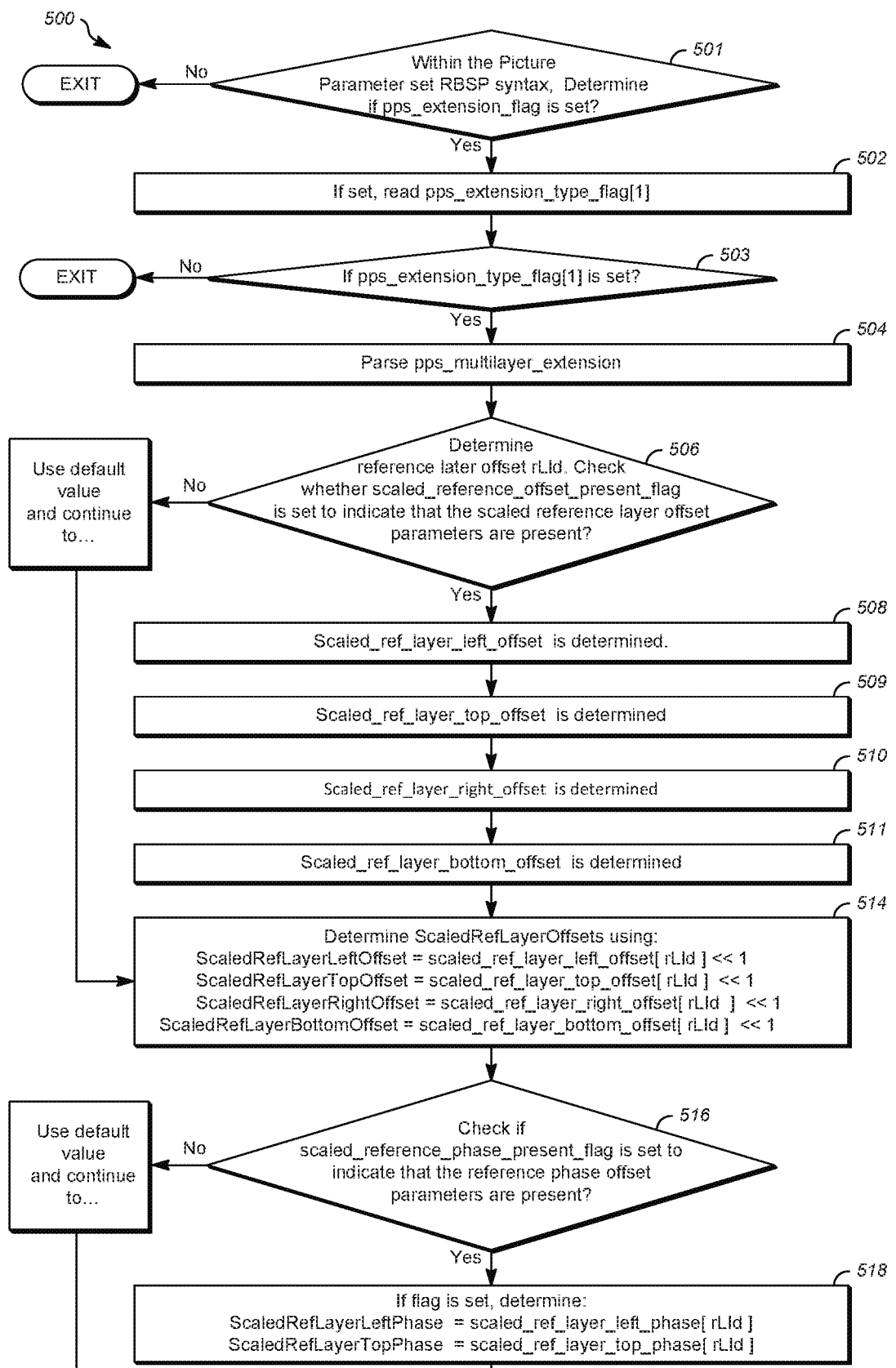
FIGS. 5a and 5b is a simplified flow chart showing the process for determining the reference layer location based upon the syntax used in a method for coding scalable video.
Figure 5B:
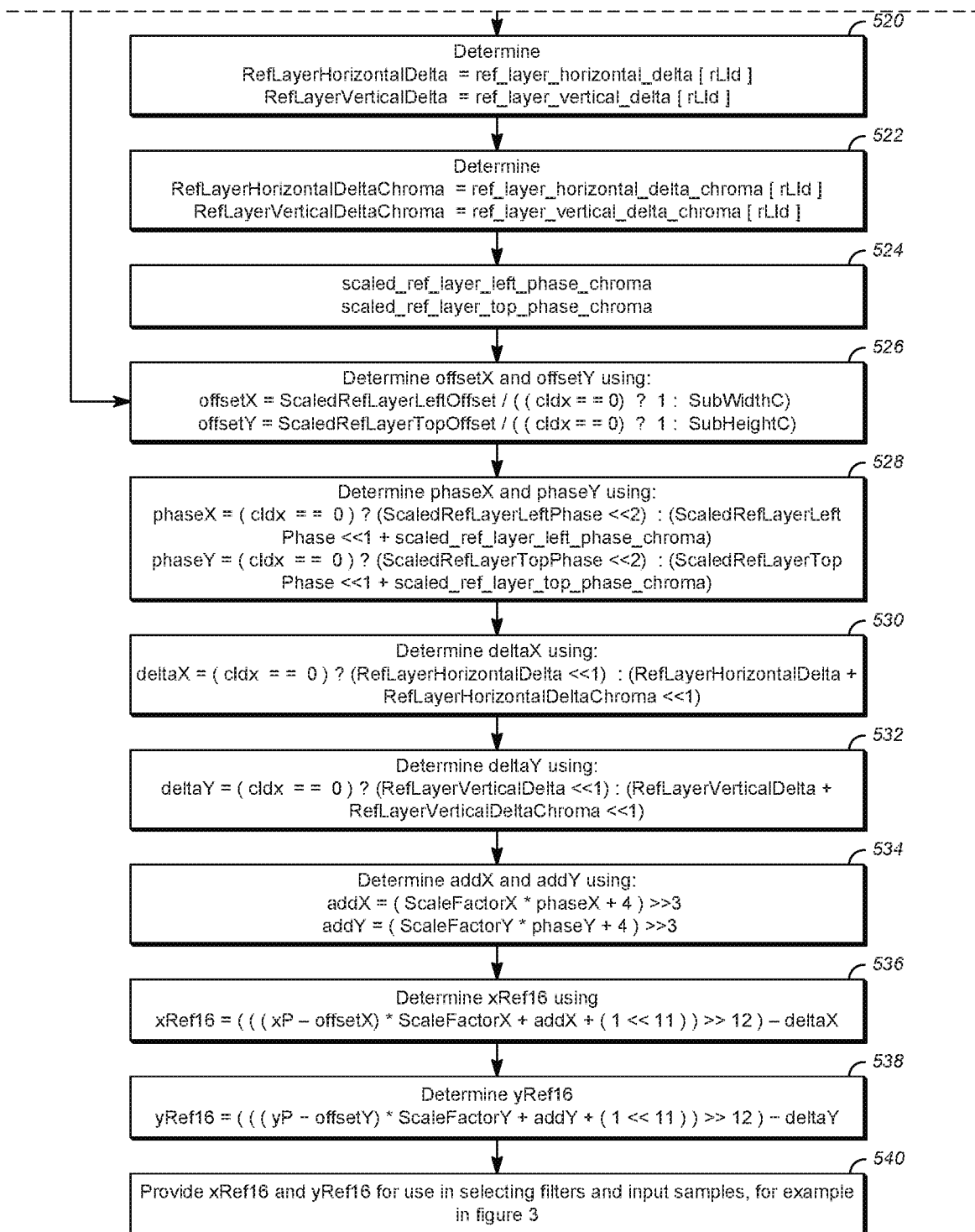

FIGS. 5a and 5b are a flow chart illustrating one example of a method 500 for coding scalable video. At block 501 within the Picture Parameter set RBSP syntax, determine if a pps_extension_flag (e.g. pps_extension_present_flag) is set. At 502, the PPS multilayer extension flag is read or examined to determine if the pps_multilayer_extension should be parsed. In some cases, for example, when using an encoder, this step is referred to as signaling. It is understood that in the case of an encoder or encoding, the corresponding encoder-appropriate terminology is assumed. At 503, if pps_extension_type_flag[1] is set, specifying that the pps_multilayer_extension syntax structure is present, the method proceeds 504 to the pps_multilayer_extension and the rest of the steps after 503 are processed.

At block 506, reference_layer_offset rLId is determined. A scaled_reference_offset_present_flag (e.g. scaled_ref_layer_offset_present_flag) is checked to determine whether it is set to indicate that the scaled reference layer offset parameters are present.

If the flag is set, at block 508, scaled_ref_layer_left_offset is determined. Next at block 509, scaled_ref_layer_top_offset is determined. At block 510, scaled_ref_layer_right_offset is determined. At block 511, scaled_ref_layer_bottom_offset is determined.

Next, at block 514, determine ScaledRefLayerOffsets using:

ScaledRefLayerLeftOffset=scaled_ref_layer_left_offset[rLId]<<1,

ScaledRefLayerTopOffset=scaled_ref_layer_top_offset[rLId]<<1,

ScaledRefLayerRightOffset=scaled_ref_layer_right_offset[rLId]<<1,

TABLE 3

Proposed syntax for signaling offsets at PPS multilayer extension.

| | Descriptor |
|---|---|
| pps_multilayer_extension( ) { | |
|   num_scaled_ref_layer_offsets | ue(v) |
|   for( i = 0; i < num_scaled_ref_layer_offsets; i++) { | |
|     scaled_ref_layer_id[ i ] | u(6) |
|     scaled_ref_layer_left_offset[ scaled_ref_layer_id[ i ] ] | se(v) |
|     scaled_ref_layer_top_offset[ scaled_ref_layer_id[ i ] ] | se(v) |
|     scaled_ref_layer_right_offset[ scaled_ref_layer_id[ i ] ] | se(v) |
|     scaled_ref_layer_bottom_offset[ scaled_ref_layer_id[ i ] ] | se(v) |
|     scaled_ref_layer_left_phase[ scaled_ref_layer_id[ i ] ] | se(v) |
|     scaled_ref_layer_top_phase[ scaled_ref_layer_id[ i ] ] | se(v) |
|     ref_layer_horizontal_delta[ scaled_ref_layer_id[ i ] ] | se(v) |
|     ref_layer_vertical_delta[ scaled_ref_layer_id[ i ] ] | se(v) |
|     ref_layer_horizontal_delta_chroma [ scaled_ref_layer_id[ i ] ] | ue(v) |
|     ref_layer_vertical_delta_chroma [ scaled_ref_layer_id[ i ] ] | ue(v) |
|   } | |
|   scaled_ref_layer_left_phase_chroma | ue(v) |
|   scaled_ref_layer_top_phase_chroma | ue(v) |
| } | |

ScaledRefLayerBottomOffset=scaled_ref_layer_bottom_offset[rLId]<<1.

At decision 516 check if scaled reference_phase_present_flag is set to indicate that the reference phase offset parameters are present If flag is set, At block 518, determine:

ScaledRefLayerLeftPhase=scaled_ref_layer_left_phase[rLId]
ScaledRefLayerTopPhase=scaled_ref_layer_top_phase[rLId]

At block 520, determine

RefLayerHorizontalDelta=ref_layer_horizontal_delta[rLId]

RefLayerVerticalDelta=ref_layer_vertical_delta[rLId]

Next, at block 522, determine

RefLayerHorizontalDeltaChroma=ref_layer_horizontal_delta_chroma[rLId]

RefLayerVerticalDeltaChroma=ref_layer_vertical_delta_chroma[rLId]

At block 524, determine:
scaled_ref_layer_left_phase_chroma
scaled_ref_layer_top_phase_chroma And then at block 526, determine offsetX and offsetY using:

offsetX=ScaledRefLayerLeftOffset/((cIdx==0)?1:SubWidthC)

offsetY=ScaledRefLayerTopOffset/((cIdx==0)?1:SubHeightC)

At block 528, determine phaseX and phaseY using:

phaseX=(cIdx==0)?(ScaledRefLayerLeftPhase<<2):(ScaledRefLayerLeftPhase<<1+scaled_ref_layer_left_phase_chroma)

phaseY=(cIdx==0)?(ScaledRefLayerTopPhase<<2):(ScaledRefLayerTopPhase<<1+scaled_ref_layer_top_phase_chroma)

Next, at block 530, determine deltaX and deltaY using:

deltaX=(cIdx==0)?(RefLayerHorizontalDelta<<1):(RefLayerHorizontalDelta+RefLayerHorizontalDeltaChroma<<1)

and at block 532 determine deltaY using:

deltaY=(cIdx==0)?(RefLayerVerticalDelta<<1):(RefLayerVerticalDelta+RefLayerVerticalDeltaChroma<<1)

Next at block 534, determine addX and addY using:

addX=(ScaleFactorX*phaseX+4)>>3 addY=(ScaleFactorY*phaseY+4)>>3

Next, at block 536 determine xRef16 using xRef16=(((xP−offsetX)*ScaleFactorX+addX+(1<<11))>>12)−deltaX At block 538 determine yRef16 yRef16=(((yP−offsetY)*ScaleFactorY+addY+(1<<11))>>12)−deltaY

Finally, at block 540, provide xRef16 and yRef16 for use in selecting filters and input samples, for example in FIG. 3.

Illustrative Operating Environment

Figure 6:
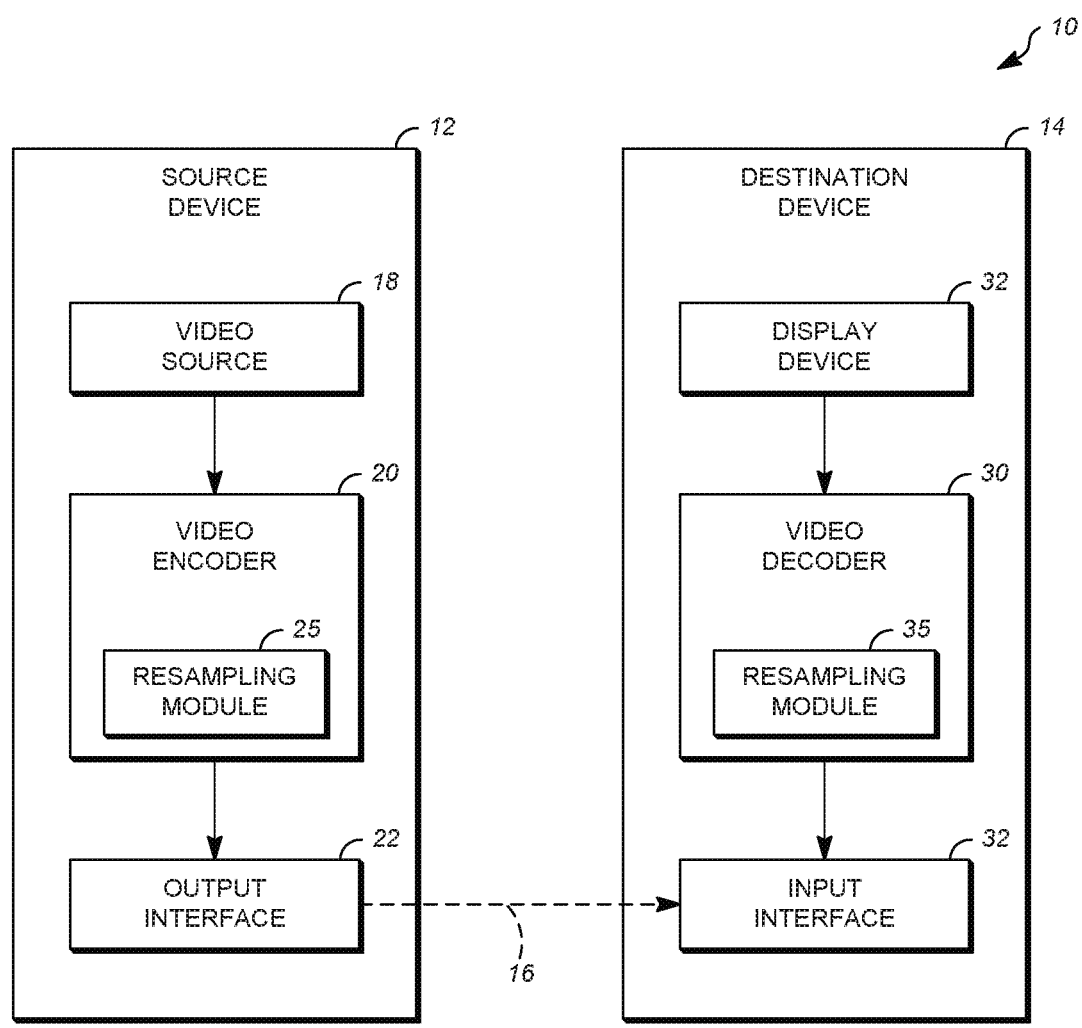
FIG. 6 is a simplified block diagram that illustrates an example video coding system.

FIG. 6 is a simplified block diagram that illustrates an example video coding system 10 that may utilize the techniques of this disclosure. As used described herein, the term "video coder" can refer to either or both video encoders and video decoders. In this disclosure, the terms "video coding" or "coding" may refer to video encoding and video decoding.

As shown in FIG. 6, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 6, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 6, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user.

Video encoder 20 includes a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters. Likewise, video decoder 30 may also include a resampling module 35 similar to the resampling module 25 employed in the video encoder 20.

Video encoder 20 and video decoder 30 may operate according to a video compression standard, such as the High Efficiency Video Coding (HEVC) standard. The HEVC standard is being developed by the Joint Collaborative Team on Video Coding JCT-VC) of ITU-T Video Coding Experts Group (VCEG) and ISO/IEC Motion Picture Experts Group (MPEG). A recent draft of the HEVC standard is described in Recommendation ITU-T H.265|International Standard ISO/TEC 23008-2, High efficiency video coding, version 2, October 2014.

Additionally or alternatively, video encoder 20 and video decoder 30 may operate according to other proprietary or industry standards, such as the ITU-T 11264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

Although the subject matter has been described in language specific to structural features and/or methodological acts, it is to be understood that the subject matter defined in the appended claims is not necessarily limited to the specific features or acts described above.

What is claimed:

1. A device for implementing a scalable video coding process for deriving a current picture, said decoder comprising:
   a memory configured to store the current picture; and
   a processor operationally coupled to the memory and configured to:
   determining scaled offsets and phase shifts from one or more picture level syntax structures in a bitstream for deriving an inter-layer reference picture, wherein the scaled offsets and phase shifts signaled in syntax elements at the picture level are adaptive per picture and applicable to slices in the picture for which they are signaled;
   deriving the inter-layer reference picture from a decoded reference picture using the scaled offsets and phase shifts, wherein the decoded reference picture is in a first coding layer in a plurality of coding layers and the inter-layer reference picture is in a second coding layer in the plurality of coding layers, the deriving including:
     identifying one or more picture sample locations identified relative to a top-left sample of a luma or chroma component of the inter-layer reference picture;
     adjusting a location of one or more of the sample locations according to a horizontal offset and a vertical offset between a picture sample location in the inter-layer reference picture in the second layer and a corresponding top-left luma or chroma sample of the decoded reference picture;
     adjusting a phase of one or more of the picture sample locations according to a luma or chroma fractional phase shift in the horizontal direction and a luma or chroma fractional phase shift in the vertical direction, wherein such fractional phase shifts adjusts the respective picture sample location in fractional units; and
   deriving the current picture using the inter-layer reference picture including pixel values at the adjusted picture sample locations.

2. The device of claim 1, wherein the scaled offsets and or the phase shifts are signaled in a pps_multilayer_extension syntax that is conditional on a pps_extension_type_flag[1] flag.

3. The device of claim 1, wherein the scaled offsets a e signaled conditional on a scaled_reference_offset_present_flag flag.

4. The device of claim 1, further comprising:
   determining if a pps_extension_type_flag[i] is set to indicate presence of the pps_multilayer_extension syntax structure;
   parsing the pps_multilayer_extension syntax structure if the pps_extension_type_flag[i] is set indicating presence of the pps_multilayer_extension syntax structure; and determining if a scaled_reference_offset_present_flag flag is set to determine whether the scaled offsets and phase shifts are present in the one or more syntax structures at the picture level.

5. The device of claim 1, wherein at least one of the scaled offsets specifies an offset between a picture sample in the current picture that is collocated with a bottom-right picture sample of the decoded reference picture in the first coding layer and a bottom-right picture sample of the current picture.

6. The device of claim 1, wherein at least one of the scaled offsets specifies an offset between a picture sample in the current picture that is collocated with a top-left picture sample of the decoded reference picture in the first coding layer and a top-left picture sample of the current picture.

7. The device of claim 1, wherein at least one of the scaled offsets specifies the horizontal component and/or at least one of the scaled offsets specifies the vertical component.

8. The device of claim 7; wherein for the horizontal component, a scaled_ref_layer_left_offset syntax element and/or a scaled_ref_layer_right_offset syntax element specifies the horizontal component of the at least one of the scaled offsets, and for the vertical component, a scaled_ref_layer_top_offset syntax element and/or a scaled_ref_layer_bottom_offset syntax element specifies the vertical component of the at least one of the scaled offsets.

9. The device of claim 7, wherein at least one of the scaled offsets specifying a horizontal component and/or a vertical component specifies a horizontal offset between a picture sample in the current picture that is collocated with a top-left picture sample of the decoded reference picture in the first coding layer and a top-left picture sample of the current picture.

10. The device of claim 7, wherein at least one of the scaled offsets specifying the horizontal component and/or the vertical component specifies a vertical offset between a picture sample in the current picture that is collocated with a bottom-right picture sample of the decoded reference picture in the first coding layer and a bottom-right picture sample of the current picture.

11. The device of claim 1, wherein the one or more syntax structures are signaled in a picture parameter set (PPS) syntax.

12. The device of claim 1, wherein at least one of the phase shifts signaled at the picture level specifies a phase shift used in a resampling process.

13. The device of claim 1, wherein at least one of the phase shifts is signaled in a pps_multilayer_extension syntax that is conditional on a pps_extension_type_flag[1] flag.

14. The device of claim 1, wherein at least one of the phase shifts is signaled conditional on a scaled_reference_phase_present_flag flag.

15. The device of claim 1, wherein at least one of the phase shifts specifies a horizontal component or a vertical component of the at least one phase shift used in the resampling process.

16. The device of claim 1, wherein the decoded reference picture in the first coding layer in the plurality of coding layers was derived from a second decoded reference picture in a third coding layer in the plurality of coding layers.

17. The device of claim 1, wherein the inter-layer reference picture is one of a plurality of derived inter-layer reference pictures used to derive the current picture.

18. The device of claim 1, wherein the inter-layer reference picture is a selected one of a plurality of derived inter-layer reference pictures for deriving the current picture.

19. The device of claim 1, wherein the corresponding value at the sample location in the current picture is interpolated from multiple sample locations in the first coding layer.

20. The device of claim 1, wherein the second picture sample in the current picture is in the second coding layer and is a picture sample located in at least one corner of the current picture.

21. The device of claim 1, wherein multiple values at respective sample locations in the current picture are predicted, and each are adjusted based on the scaled offsets.

22. The device of claim 1, the derivation of the inter-layer reference picture including adjusting picture samples in the inter-layer reference picture by aligning derived picture samples in an inter-layer reference picture array with the current picture based on the scaled offsets.

* * * * *

UNITED STATES PATENT AND TRADEMARK OFFICE
CERTIFICATE OF CORRECTION

PATENT NO. : 10,750,194 B2
APPLICATION NO. : 16/516228
DATED : August 18, 2020
INVENTOR(S) : Koohyar Minoo, David M. Baylon and Ajay Luthra It is certified that error appears in the above-identified patent and that said Letters Patent is hereby corrected as shown below:

In the Specification

Column 5, Line 5: Replace "h[0,p],h[n;p]" with --h[0,p], ..., h[n;p]--

Column 5, Line 14: Replace "h[n,1], h[n,p-1]" with --h[n,1], ..., h[n,p-1]--

Column 5, Line 42: Replace "1/16" with --1/16-th--

Column 11, Line 67: Replace "14," with --14.--

Column 13, Line 16: Replace "ISO/TEC" with --ISO/IEC--

Column 13, Line 20: Replace "11264"with --H.264--

In the Claims

Column 14, Line 57: Replace "a e" with --is--

Signed and Sealed this
Twenty-sixth Day of March, 2024

Katherine Kelly Vidal
*Director of the United States Patent and Trademark Office*